(12) United States Patent
Lachnitt (10) Patent No.: US 9,573,533 B2
(45) Date of Patent: Feb. 21, 2017

(54) MOBILE TELEPHONE INTEGRATION SYSTEM

(71) Applicant: Peiker Acustic GmbH & Co. KG, Friedrichsdorf (DE)

(72) Inventor: Jens Lachnitt, Alsfeld (DE)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 4 days.

(21) Appl. No.: 14/532,073

(22) Filed: Nov. 4, 2014

(65) Prior Publication Data

US 2015/0126248 A1 May 7, 2015

(30) Foreign Application Priority Data

Nov. 7, 2013 (DE) .................. 10 2013 018 595

(51) Int. Cl.
| | |
|---|---|
| *B60R 11/02* | (2006.01) |
| *H04M 1/02* | (2006.01) |
| *H02J 7/02* | (2016.01) |
| *H04M 1/04* | (2006.01) |
| *H02J 7/00* | (2006.01) |
| *H02J 50/10* | (2016.01) |

(52) U.S. Cl.
CPC .......... *B60R 11/0241* (2013.01); *H02J 7/0044* (2013.01); *H02J 7/025* (2013.01); *H02J 50/10* (2016.02); *H04M 1/0202* (2013.01); *H04M 1/04* (2013.01)

(58) Field of Classification Search
CPC .... H04B 1/3877; H04B 1/3883; H02J 7/0044; H02J 7/025; H04M 1/0202; H04M 1/04; H04M 1/6075; B60R 11/0241; B60R 11/024; B60R 2011/0042; B60R 2011/0043; B60R 2011/0045; B60R 2011/0047; B60R 2011/0049; B60R 2011/0052; B60R 2011/0059; B60R 2011/0063; B60R 2011/0064; B60R 2011/0071; B60R 2011/0075; B60R 2011/0077

See application file for complete search history.

(56) References Cited

U.S. PATENT DOCUMENTS

| | | | | |
|---|---|---|---|---|
| 2007/0008233 | A1* | 1/2007 | Strauss .................. | H01Q 1/243 343/713 |
| 2009/0109352 | A1* | 4/2009 | Lewis ................. | B60R 11/0235 348/837 |
| 2011/0227527 | A1* | 9/2011 | Zhu ........................ | H02J 7/0044 320/108 |
| 2013/0307470 | A1* | 11/2013 | Watanabe ............... | H02J 7/025 320/108 |
| 2015/0115877 | A1* | 4/2015 | Arai ........................ | H02J 7/025 320/108 |

OTHER PUBLICATIONS

Andrew Berg, "Wireless Charging and a Tale of Two Standards", Jul. 3, 2013, www.wirelessweek.com.*

* cited by examiner

*Primary Examiner* — George Eng
*Assistant Examiner* — Hung Du
(74) *Attorney, Agent, or Firm* — Burr & Brown, PLLC (57) ABSTRACT

The invention relates to a mobile telephone integration system for integration of a mobile telephone into a vehicle.

21 Claims, 7 Drawing Sheets

MOBILE TELEPHONE INTEGRATION SYSTEM

This application claims the benefit under 35 USC §119 (a)-(d) of German Application No. 10 2013 018 595.5 filed Nov. 7, 2013, the entirety of which is incorporated herein by reference.

BACKGROUND OF THE INVENTION

Field of the Invention

The invention relates to a mobile telephone integration system.

Description of Related Art

A large number of charging mats which operate in accordance with different standards and with which suitable mobile telephones can be inductively charged are known. Charging mats of this kind are sold under the names Powermat, WPC and A4WP for example.

SUMMARY OF THE INVENTION

The present invention is based on the object of developing a mobile telephone integration system for vehicles and, respectively, a vehicle mobile telephone integration system which can be conveniently converted to match different standards in respect of the charging mat technology used.

The essence of the present invention is a multipartite design of the mobile telephone integration system, the system comprising at least one adapter which is matched to a specific charging technology and a holding and contact apparatus, which is connected to the vehicle, for the one adapter or one of the adapters, and the adapter and holding and contact apparatus being detachably connected in a mechanically interlocking manner and in an electrical manner. As a result, an adapter can be easily exchanged for another adapter, so that the vehicle can be converted for different charging techniques with minimum expenditure and without losses in convenience.

Within the meaning of the invention, a connection which is designed in an electrically wireless manner is understood to mean a wireless electrical connection which is suitable, in particular, for wireless data transmission and/or for wireless energy transfer.

Within the meaning of the invention, the term "mobile telephone" is also understood to mean so-called smartphones and so-called tablets, the term "mobile telephone" also including electronic devices without a telephone module within the meaning of the invention.

A multicore electrical line is also referred to within the meaning of the invention when, for example, a plurality of conductor tracks which are separate from one another are present on a printed circuit board.

BRIEF DESCRIPTION OF THE DRAWINGS

Further details of the invention will be described with reference to schematically illustrated exemplary embodiments in the drawing, in which.

DETAILED DESCRIPTION OF THE INVENTION

Figure 1:
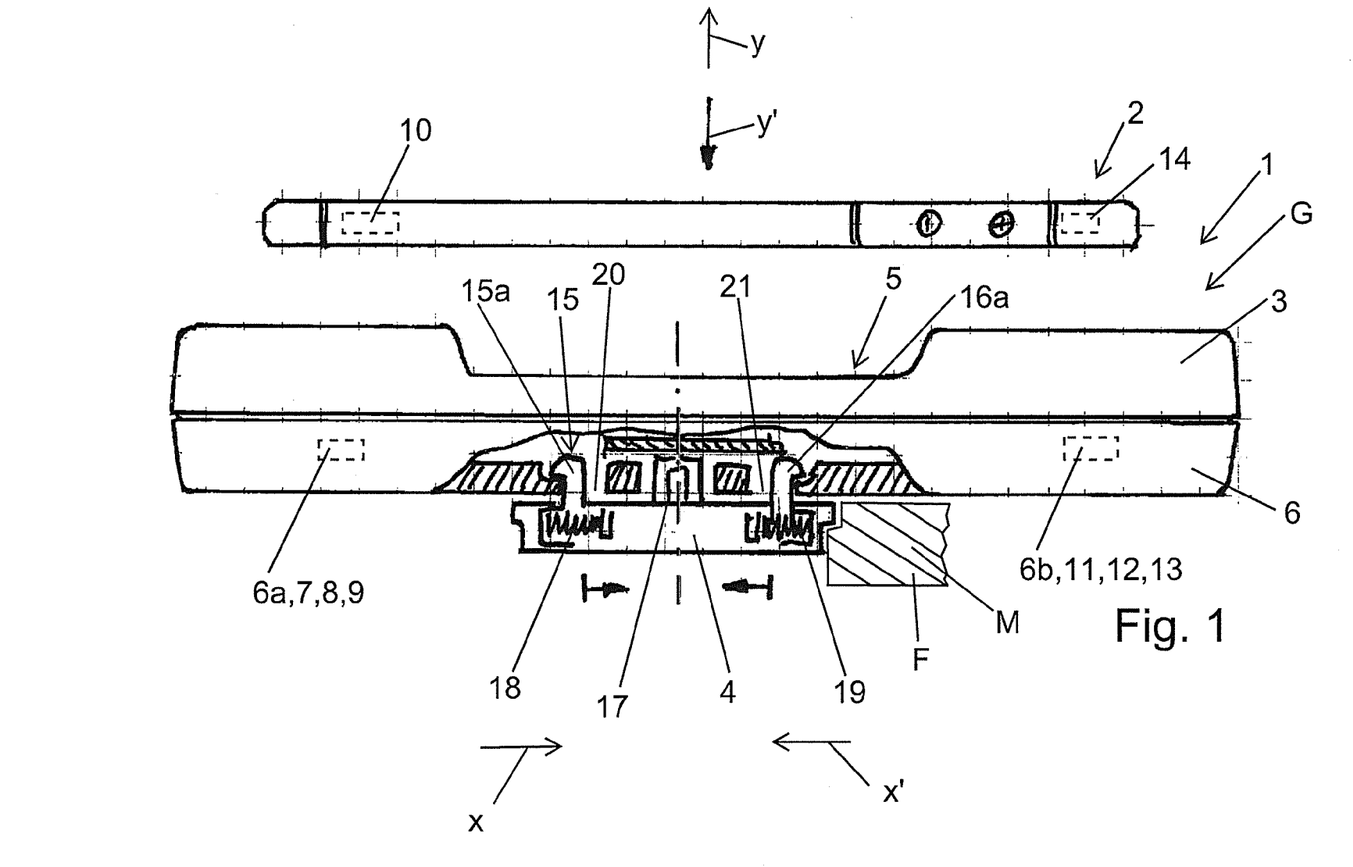
FIG. 1 shows a partially sectioned side view of an adapter and of a holding and contact apparatus of a first mobile telephone integration device, a mobile telephone being illustrated in side view above the first mobile telephone integration device.

FIG. 1 shows a partially sectioned side view of a mobile telephone integration device 1, and, respectively, a vehicle mobile telephone integration system. The mobile telephone integration device 1 comprises an adapter 3 and a holding and contact apparatus 4. A mobile telephone 2 which is intended to be placed on the charging surface 5 in arrow direction y' is illustrated in side view above a charging surface 5 of the adapter 3. The adapter 3 is in a use position G in which the adapter is mechanically and electrically connected to the holding and contact apparatus 4 and is secured on the holding and contact apparatus 4 against being removed in an arrow direction y. The holding and contact apparatus 4 is fastened to a vehicle F, only a detail of a portion of a wall of a center console M of the vehicle F being illustrated. The adapter 3 comprises a main body 6 on which the charging surface 5 is formed. The adapter 3 further comprises a first interface 6a to the mobile telephone 2, the first interface 6a being in the form of a wireless charging interface 7 via which electrical energy can be wirelessly transmitted from a charging coil 8 of an inductive charging unit 9 of the adapter 3 to a receiver coil 10 of the mobile telephone 2. The adapter 3 further comprises a second interface 6b which is in the form of a wireless antenna coupling interface 11 via which antenna signals can be transmitted between a coupling antenna 12 of a coupling device 13 of the adapter 3 and an antenna 14 of the mobile telephone 2. In the use position G, the adapter 3 is mechanically connected to the holding and contact apparatus 4 in such a way that an interlocking connection between the adapter 3 and the holding and contact apparatus 4 is established by the holding means 15 and 16. This connection is formed in such a way that the adapter 3 is fixed to the holding and contact apparatus 4 against being removed in the arrow direction y and from rotating about the y axis. In this case, the adapter 3 is connected electrically by wire to the holding and contact apparatus 4 in the use position G in such a way that a multicore electrical line of the adapter 3 is connected electrically by wire to a multicore electrical line 17 of the holding and/or contact apparatus 4.

In order to release the adapter 3 from the holding and contact apparatus 4 from its use position G, a control means, not illustrated, of the mobile telephone integration device 1 is used, it being possible for the holding means 15 to be displaced in the arrow direction x and for the holding means 16 to be displaced in the arrow direction x' by the control means, so that the adapter 3 can be drawn in the arrow direction y without the hook-like free ends 15a and 16a of the holder means 15 and 16 colliding with the adapter 3 and being able to be routed out of recesses 20, 21 of the adapter 3 without resistance. To this end, the control means is preferably designed as a clip which is bent in the manner of a u and, by way of in each case one end, acts on the holding means 15 and the holding means 16 or on components which are connected to the holding means. In order to allow the control means to act from above the charging surface 5, the adapter 3 has corresponding slots or openings which allow the control means to move to a sufficient extent. In this case, provision is made for the control means to be installed permanently in the adapter 3 or for the control means to be designed as a separate component which is used only in the case in which the adapter 3 is exchanged for another adapter. According to one variant embodiment, electrical operation of the installed holding means is also provided. In particular, provision is made for a position of the holding means to be controlled by means of at least one solenoid, current being applied to the solenoid in order to release the adapter.

Figure 2:
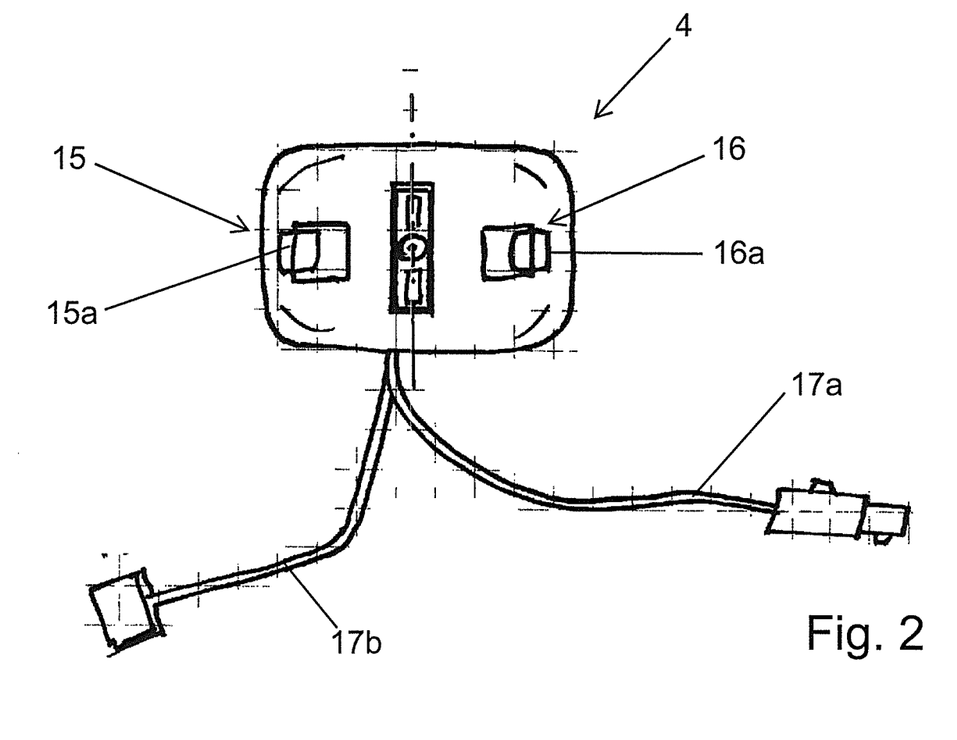
FIG. 2 shows a plan view of the holding and contact apparatus shown in FIG. 1, with the adapter removed.

FIG. 2 now shows a plan view of the holding and/or contact apparatus 4 known from FIG. 1. In FIG. 2, two lines 17a, 17b can also be seen in the plan view, the lines being combined to form the multicore line 17 which is indicated in FIG. 1. The line 17a is an antenna cable which leads to an external antenna or to an antenna amplifier. The line 17b is a data and/or control line and/or power supply line which is connected to further components of the vehicle and is connected, in particular, to a vehicle bus. The free ends 15a and 16a of the holding means 15 and 16 are shown in a blocked position in FIG. 2. Since the free ends 15a and 16a have slopes, it is possible for an adapter to push simply onto the holding and/or contact apparatus 4 without the use of the control means, so that the holding means 15 and 16 move back under compression of the springs 18, 19, which are visible only in FIG. 1, and then latch into the main body 6 of the adapter 3 in order to hold the adapter permanently in an interlocking manner.

Figure 3:
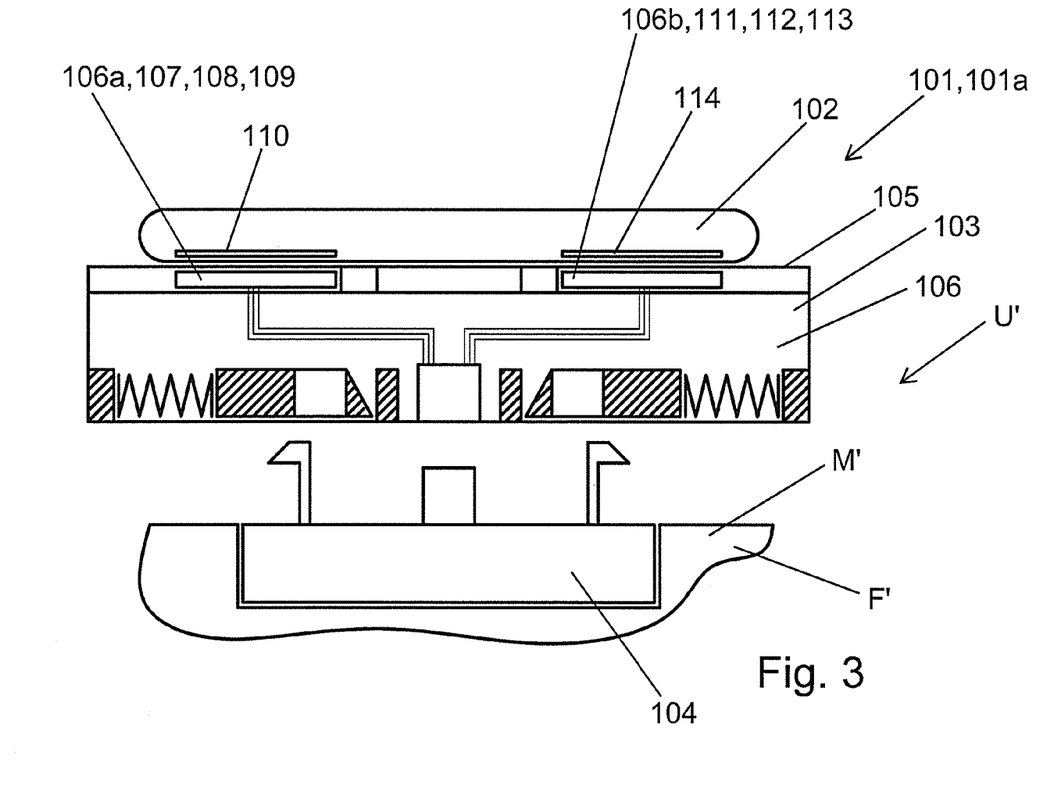
FIG. 3 shows a partially sectioned side view of an adapter and of a holding and contact apparatus of a second mobile telephone integration device, a mobile telephone being illustrated in side view above the second mobile telephone integration device.
Figure 4:
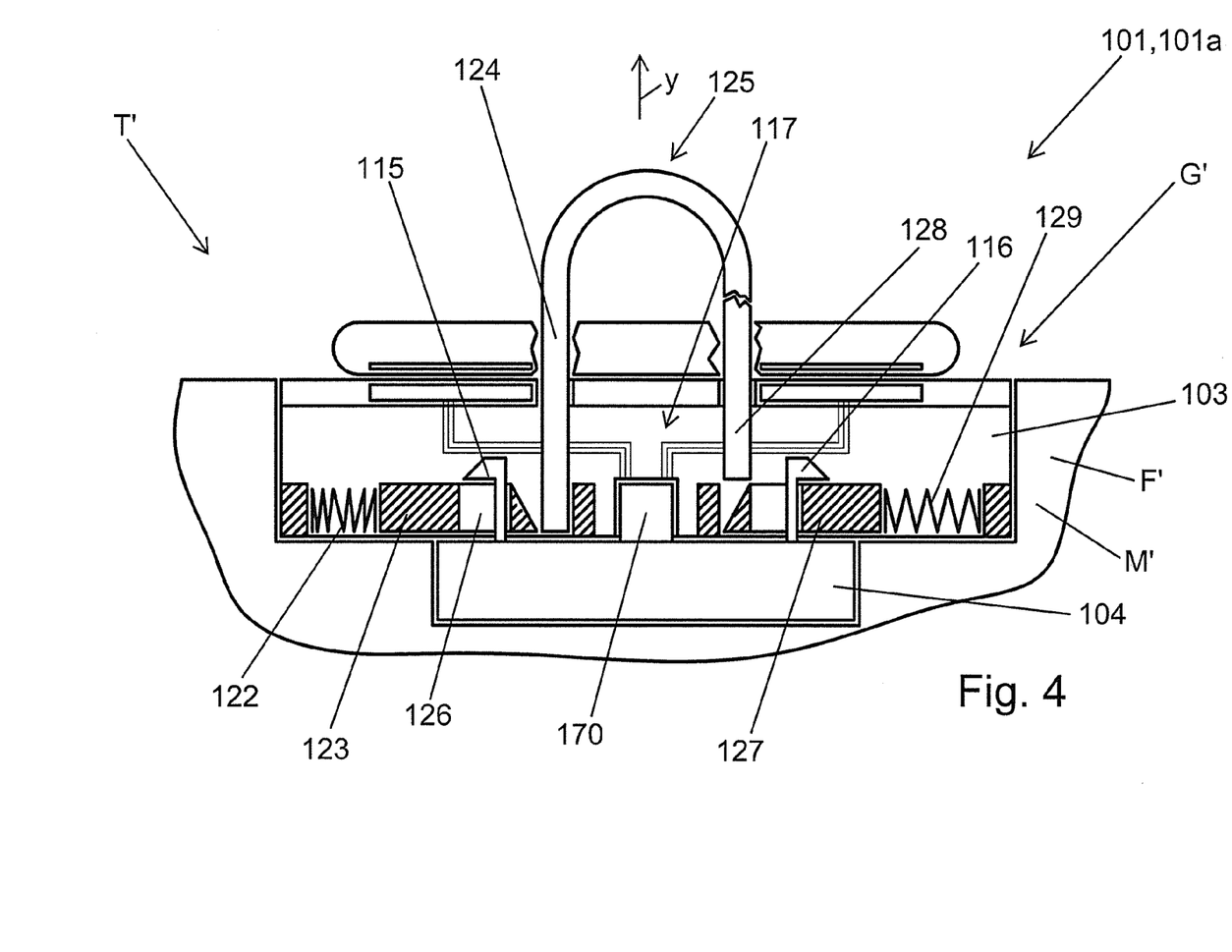
FIG. 4 shows an arrangement according to FIG. 3, the adapter being connected to the holding and contact apparatus.

FIG. 3 shows a partially sectioned side view of a second mobile telephone integration device 101, and, respectively, a second vehicle mobile telephone integration system 101a. The mobile telephone integration device 101 comprises an adapter 103 and a holding and contact apparatus 104. A mobile telephone 102 which can be charged by the mobile telephone integration device 101 and can be coupled to an external vehicle antenna is illustrated in side view on a charging surface 105 of the adapter 103. In the illustration of FIG. 3, the adapter 103 is still located in an uncoupled position U' in which the adapter is still neither mechanically nor electrically connected to the holding and contact apparatus 104 and is still not secured on the holding and contact apparatus 104 against being removed in an arrow direction y. The holding and contact apparatus 104 is fastened to a vehicle F', only a detail of a portion of a wall of a center console M' of the vehicle F' being illustrated. The adapter 103 comprises a main body 106 on which the charging surface 105 is formed. The adapter 103 further comprises a first interface 106a to the mobile telephone 102, the first interface 106a being in the form of a wireless charging interface 107 via which electrical energy can be wirelessly transmitted from a charging coil 108 of an inductive charging unit 109 of the adapter 103 to a receiver coil 110 of the mobile telephone 102. The adapter 103 also comprises a second interface 106b which is in the form of a wireless antenna coupling interface 111 via which antenna signals can be transmitted between a coupling antenna 112 of a coupling device 113 of the adapter 103 and an antenna 114 of the mobile telephone 102. In a use position G' which is shown in FIG. 4 and is achieved by the adapter being pushed onto the holding and contact apparatus 104 in arrow direction y', the adapter 103 is mechanically connected to the holding and contact apparatus 104 in such a way that an interlocking connection between the adapter 103 and the holding and contact apparatus 104 is established by the holding means 115 and 116. This connection is formed in such a way that the adapter 103 is now fixed to the holding and contact apparatus 104 against being removed in the arrow direction y' and from being rotated about the y axis. In this case, the adapter 103 is also connected electrically by wire to the holding and contact apparatus 104 in the use position G' in such a way that a multicore electrical line 170 of the adapter 103 is connected electrically by wire to a multicore electrical line 117 of the holding and contact apparatus 104. In a departure from the use position G', FIG. 4 shows how a slide 123, which is acted on by a spring 122 in the direction of the holding means 115, is pushed back against the force of the spring 122 by a pin 124 of a control means 125 and, as a result, an opening 126, which is formed in the slide 123, is moved to a position in which the adapter 103 can be removed from the holding and contact apparatus 104 without being caught on the holding means 115. It goes without saying that, to this end, a second slide 127 which is in contact with the holding means 116 is also pushed back against its spring 129 by a further pin 128 of the control means 125, the pin 128 still being shown in a position in which the process of forcing back the slide 127 first begins. In this respect, the right-hand slide 127 is in a position which is typical of the use position G', and the left-hand slide 123 is in a position which is typical of a disconnection position T'.

Figures 5, 6:
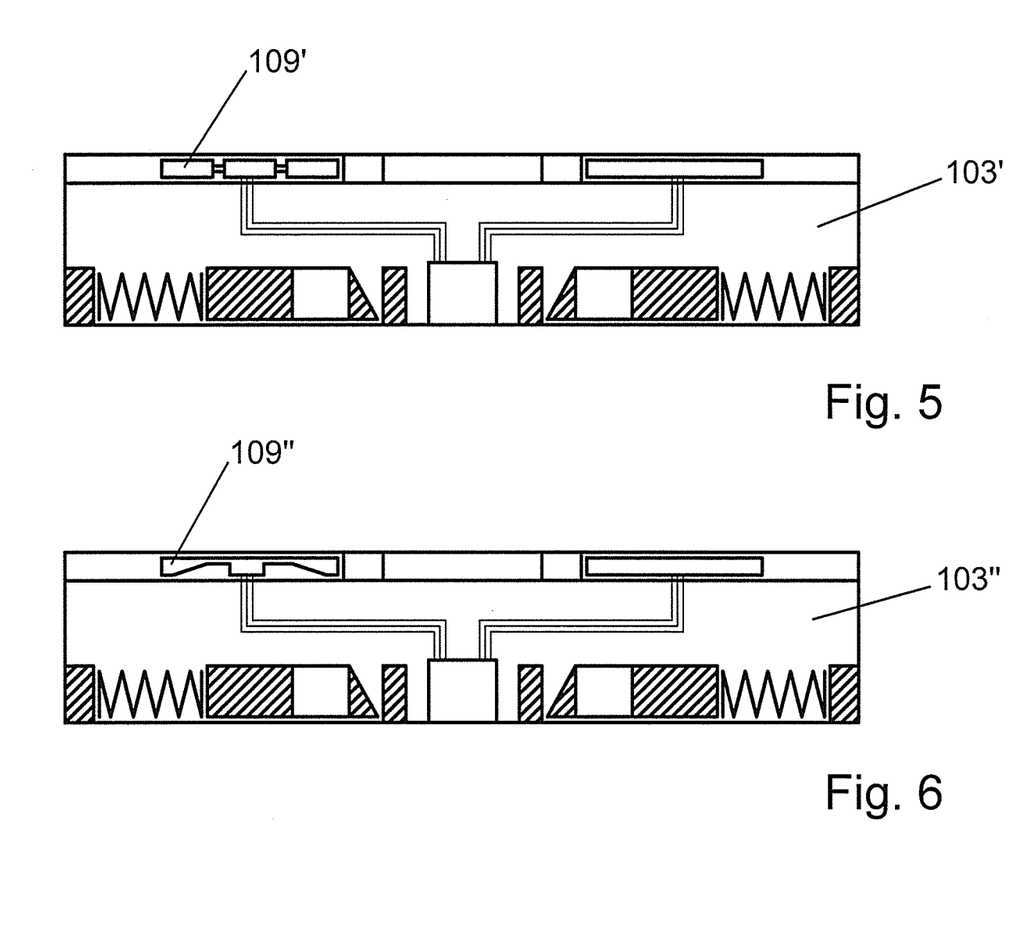
FIG. 5 shows a first variant embodiment of the adapter which is shown in FIGS. 3 and 4.
FIG. 6 shows a second variant embodiment of the adapter which is shown in FIGS. 3 and 4.

FIGS. 5 and 6 further show a second adapter 103' and a third adapter 103" which are suitable for being assembled instead of the adapter 103 which is shown in FIGS. 3 and 4 and the holding and contact apparatus 104 which is shown in FIGS. 3 and 4. In this case, the charging unit 109 of the first adapter 103 operates in accordance with a standard for Wireless Power Consortium (WPC) standard charging mats, and, in this case, the charging unit 109' of the second adapter 103' operates in accordance with a standard for Powermat charging mats, and, in this case, the charging unit 109" of the further adapter 103" operates in accordance with a standard for Alliance for Wireless Power (A4WP) standard charging mats.

Figure 7:
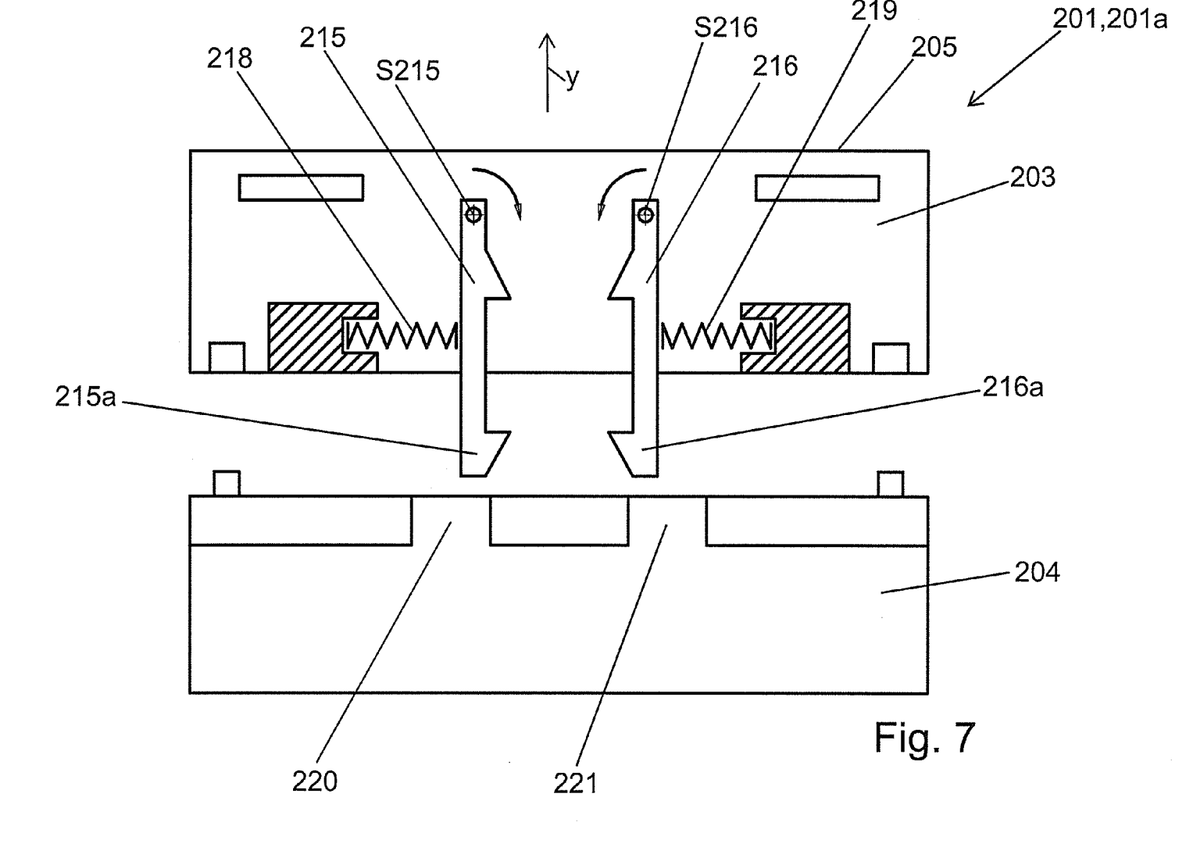
FIG. 7 shows a partially sectioned side view of an adapter and of a holding and contact apparatus of a third mobile telephone integration device.
Figure 8:
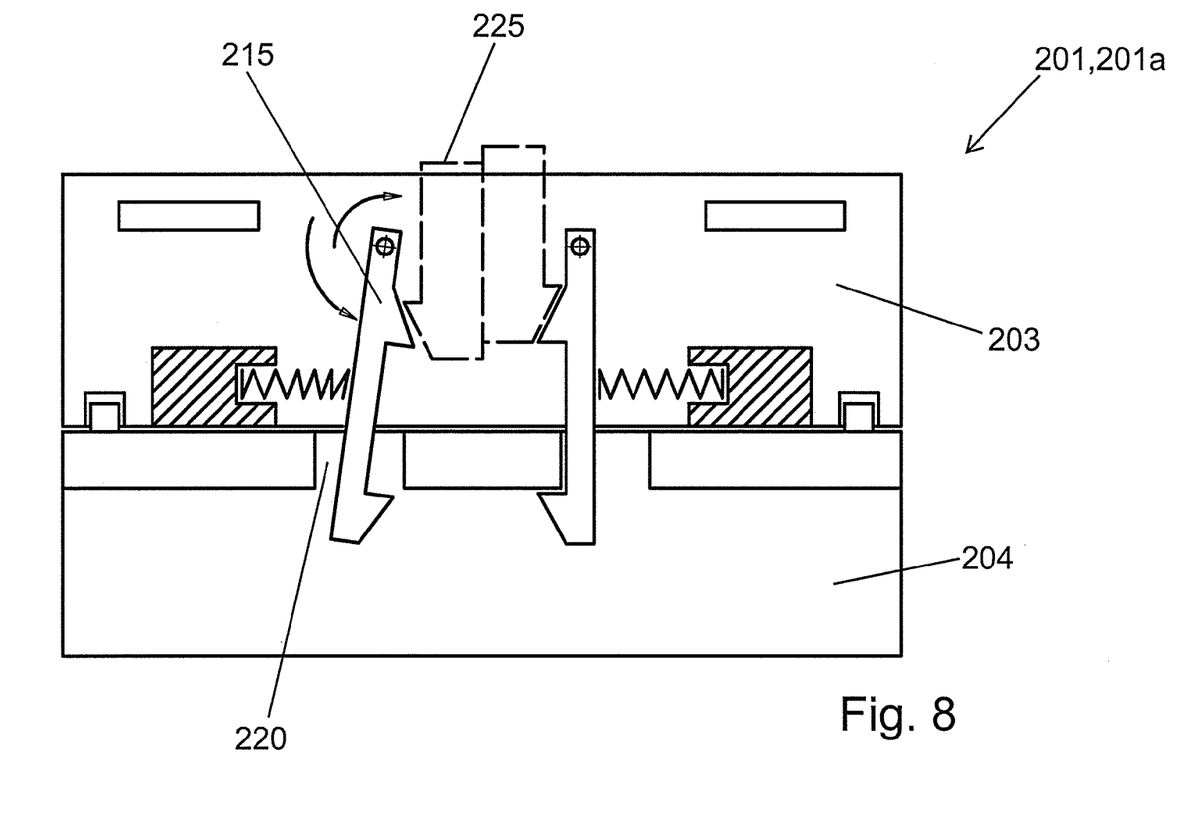
FIG. 8 shows an arrangement according to FIG. 7, the adapter being connected to the holding and contact apparatus.

FIG. 7 shows a partially sectioned side view of a third mobile telephone integration device 201, and, respectively, a third vehicle mobile telephone integration system 201a. The mobile telephone integration device 201 comprises an adapter 203 and a holding and contact apparatus 204. A mobile telephone, not illustrated, can be placed on a charging surface 205 of the adapter 203, and can be charged and can be coupled to an external vehicle antenna there. The schematic illustration of FIG. 7 serves to describe an embodiment of a mechanism for connecting the adapter 203 to the holding and contact apparatus 204. The adapter 203 comprises two holding means 215, 216, the holding means each being arranged on the adapter 203 such that they can pivot, against a spring force of a spring 218 and 219, respectively, about a pivot axis S215 and S216, respectively. In this case, the holding and contact apparatus 204 has a recess 220, 221 for each holding means, the holding means engaging in the recess by way of a free end 215a, 216a when the adapter 203 is coupled to the contact apparatus 204 (see FIG. 8). The left-hand holding means 215 is shown in a pivoted position in FIG. 8. This pivoted position is assumed when the adapter 203 is pushed onto the holding and contact apparatus 204. This pivoted position is also assumed when the holding means 215 is operated by a control means 225 in order to release the adapter 203 from the holding and contact apparatus 204 in order to replace the adapter, for example, with another adapter.

LIST OF REFERENCE SYMBOLS

1 Mobile telephone integration device
2 Mobile telephone
3 Adapter
4 Holding and contact apparatus
5 Charging surface
6 Main body
6a First interface
6b Second interface
7 Wireless charging interface
8 Charging coil
9 Inductive charging unit
10 Receiver coil
11 Wireless antenna coupling interface
12 Coupling antenna
13 Coupling device
14 Antenna of 2
15 Holding means
15a Free end of 15
16 Holding means
16b Free end of 16
17 Multicore electrical line
17a Antenna cable
17b Data and/or control line and/or power supply line
18, 19 Spring
20, 21 Recess
101 Second mobile telephone integration device
101a Second vehicle mobile telephone integration system
102 Mobile telephone
103 Adapter 1
103' Second adapter
103" Third adapter
104 Holding and contact apparatus
105 Charging surface
106 Main body
106a First interface
106b Second interface
107 Wireless charging interface
108 Charging coil
109 Inductive charging unit
109' Charging unit
109" Charging unit
110 Receiver coil
111 Wireless antenna coupling interface
112 Coupling antenna
113 Coupling device
114 Antenna
115, 116 Holding means
117 Electrical line of 104
122 Spring
123 Left-hand slide
124 Pin of 125
125 Control means
126 Opening in 123
127 Right-hand slide
128 Pin of 125
129 Spring
170 Multicore electrical line of 103
201 Third mobile telephone integration device
201a Third vehicle mobile telephone integration system
203 Adapter
204 Holding and contact apparatus
205 Charging surface
215, 216 Holding means
218, 219 Spring
220, 221 Recess in 204
215a Free end of 215
216a Free end of 216
225 Control means
x, x' Arrow direction
y, y' Arrow direction
F Vehicle
F' Vehicle
G Use position
G' Use position
M Center console
M' Center console
S215 Pivot axis of 215
S216 Pivot axis of 216
T' Disconnection position
U' Uncoupled position

The invention claimed is:

1. A mobile telephone integration system for integration of a mobile telephone into a vehicle, comprising at least a first adapter and a holding and contact apparatus,
the first adapter comprising a bearing surface,
it being possible for the mobile telephone to be placed on the bearing surface,
the holding and contact apparatus being fastened to the vehicle,
the first adapter being detachably connected to the holding and contact apparatus and comprising a main body, and a first interface to the mobile telephone,
the first interface of the first adapter being in the form of a wireless charging interface by means of which electrical energy can be wirelessly transmitted from a charging coil of an inductive charging unit of the first adapter to a receiver coil of the mobile telephone,
when the first adapter is mechanically connected to the holding and contact apparatus in a use position, and
the first adapter is connected electrically to the holding and contact apparatus in the use position in such a way that a multicore electrical line of the first adapter is connected electrically by one of a wire and wirelessly to a multicore electrical line of the holding and contact apparatus,
wherein the first adapter further comprises at least one holding means, the at least one holding means being arranged on the first adapter to be at least one of pivotable against a spring force of a spring about a pivot axis, displaceable against the spring force of the spring, and rotatable about a rotation axis against the spring force of the spring.

2. The mobile telephone integration system as claimed in claim 1, the first adapter further comprising a second interface to the mobile telephone, which is in the form of a wireless antenna coupling interface between a coupling antenna of a coupling device of the first adapter and an antenna of the mobile telephone for transmission of antenna signals to and from the mobile telephone.

3. The mobile telephone integration system as claimed in claim 1, wherein the first adapter is mechanically connected to the holding and contact apparatus in a use position in such a way that an interlocking connection between the first adapter and the holding and contact apparatus is established by the at least one holding means, said connection designed such that the first adapter is fixed to the holding and contact apparatus to prevent removal.

4. The mobile telephone integration system as claimed in claim 1, wherein the wireless charging interface of the first adapter is operated in accordance with a first standard.

5. The mobile telephone integration system as claimed in claim 1, further comprising a second adapter, a wireless charging interface of the second adapter being operated in accordance with a second wireless charging standard, the second wireless charging standard being different from a first wireless charging standard used by the first adapter, wherein at least the second adapter and the first adapter are used alternately with the holding and contact apparatus in the mobile telephone integration system.

6. The mobile telephone integration system as claimed in claim 1, further comprising a third adapter, a wireless charging interface of the third adapter being operated in accordance with a third wireless charging standard, the third wireless charging standard being different from at least a first wireless charging standard used by the first adapter, wherein the third adapter and the first adapter are used alternately with the holding and contact apparatus in the mobile telephone integration system.

7. The mobile telephone integration system as claimed in claim 1, wherein the holding and contact apparatus further comprises at least one recess for engaging a free end of the at least one holding means of the first adapter.

8. The mobile telephone integration system as claimed in claim 1, further comprising a control means, the control means positioned on the bearing surface and during operation entering at least one of the first adapter and the contact and holding apparatus, the operation of said control means operating the at least one holding means against the spring force in the use position such that the interlocking connection between the holding means and the first adapter is canceled.

9. The mobile telephone integration system as claimed in claim 8, wherein the control means is in the form of a bar with several offset portions.

10. The mobile telephone integration system as claimed in claim 1, wherein the inductive charging unit of the first adapter is operated in accordance with a Wireless Power Consortium (WPC) standard for WPC charging mats.

11. The mobile telephone integration system as claimed in claim 1, wherein the first adapter is held in an interlocking manner in a console of the vehicle and the holding and contact apparatus is in the form of a contact apparatus.

12. The mobile telephone integration system as claimed in claim 5,
wherein the second adapter further comprises at least one holding means, the at least one holding means being arranged on the second adapter to be at least one of pivotable against a spring force of a spring about a pivot axis, displaceable against the spring force of the spring, and rotatable about a rotation axis against the spring force of the spring.

13. The mobile telephone integrations system as claimed in claim 6,
wherein the third adapter further comprises at least one holding means, the at least one holding means being arranged on the third adapter to be at least one of pivotable against a spring force of a spring about a pivot axis, displaceable against the spring force of the spring, and rotatable about a rotation axis against the spring force of the spring.

14. The mobile telephone system as claimed in claim 12, wherein the one recess of the holding and contact apparatus engages a free end of the at least one holding means of the second adapter.

15. The mobile telephone system as claimed in claim 13, wherein the holding and contact apparatus further comprises at least one recess for engaging a free end of the holding means of the third adapter.

16. The mobile telephone system as claimed in claim 12, further comprising a control means positioned on a bearing surface of the second adapter and when depressed during operation enters at least one of the second adapter and the holding and contact apparatus, the operation of said control means operating the at least one holding means against the spring force in the use position such that the interlocking connection between the holding means and the second adapter is canceled.

17. The mobile telephone system as claimed in claim 13, further comprising a control means positioned on the bearing surface of the third adapter and when depressed during operation enters at least one of the third adapter and the contact and holding apparatus, the operation of said control means operating the at least one holding means against the spring force in the use position such that the interlocking connection between the holding means and the third adapter is canceled.

18. The mobile telephone system as claimed in claim 16, wherein the control means is in the form of a bar with several offset portions.

19. The mobile telephone system as claimed in claim 17, wherein the control means is in the form of a bar with several offset portions.

20. The mobile telephone system as claimed in claim 5, wherein a charging unit of the second adapter is operated in accordance with a Powermat standard for Powermat charging mats.

21. The mobile telephone system as claimed in claim 6, wherein a charging unit of the third adapter is operated in accordance with an Alliance for Wireless Power (A4WP) standard for A4WP charging mats.

\* \* \* \* \*